United States Patent [19]
Konishi et al.

[11] Patent Number: 5,404,192
[45] Date of Patent: Apr. 4, 1995

[54] CAMERA HAVING A RAPID PICTURE-TAKING OPERATION

[75] Inventors: Yuichiro Konishi, Tokyo; Masanori Ohtsuka, Yokohama, both of Japan

[73] Assignee: Canon Kabushiki Kaisha, Tokyo, Japan

[21] Appl. No.: 136,104

[22] Filed: Oct. 14, 1993

Related U.S. Application Data

[63] Continuation of Ser. No. 8,320, Jan. 25, 1993, abandoned.

[30] Foreign Application Priority Data

Jan. 31, 1992 [JP] Japan ................................. 4-040734

[51] Int. Cl.[6] .................. G03B 7/28; G03B 13/36; G03B 15/03
[52] U.S. Cl. ..................... 354/402; 354/415; 354/432
[58] Field of Search .............. 354/400, 402, 432, 429, 354/431, 415

[56] References Cited

U.S. PATENT DOCUMENTS

| | | | |
|---|---|---|---|
| 4,774,401 | 9/1988 | Yamada et al. | 354/432 |
| 4,974,007 | 11/1990 | Yoshida | 354/402 |
| 4,999,663 | 3/1991 | Nakamura | 354/415 |
| 5,130,735 | 7/1992 | Kusaka et al. | 354/402 |
| 5,202,719 | 4/1993 | Taniguchi et al. | 354/413 |
| 5,202,720 | 4/1993 | Fujimo et al. | 354/415 |
| 5,231,446 | 7/1993 | Ohtsuka | 354/415 |

FOREIGN PATENT DOCUMENTS

| | | |
|---|---|---|
| 1235932 | 9/1989 | Japan. |
| 1244435 | 9/1989 | Japan. |
| 1244436 | 9/1989 | Japan. |
| 1244437 | 9/1989 | Japan. |
| 318523 | 2/1991 | Japan. |
| 3144427 | 6/1991 | Japan. |
| 3144428 | 6/1991 | Japan. |

*Primary Examiner*—W. B. Perkey
*Attorney, Agent, or Firm*—Fitzpatrick, Cella, Harper & Scinto

[57] ABSTRACT

A camera having a selective rapid picture-taking exposure mode includes detection circuitry for detecting at least one of information on the distance to an object and information on a defocus amount corresponding to the object. The detection circuitry having a detection field area changeable between a wide field area and a narrow field area. Changing circuitry is provided for changing the detection field area of the detection circuitry to a narrow field area when the rapid picture-taking exposure mode is selected. Also, a photometric field area and/or a red-eye-reduction operation may be changed when the rapid picture-taking exposure mode is selected.

207 Claims, 6 Drawing Sheets

CAMERA HAVING A RAPID PICTURE-TAKING OPERATION

This application is a continuation of application Ser. No. 08/008,320 filed Jan. 25, 1993, now abandoned.

BACKGROUND OF THE INVENTION

1. Field of the Invention

This invention relates to an improvement in a camera designed so as to have a suitable rapid picture-taking performance.

2. Description of the Related Art

Almost all conventional automatic focusing cameras have been designed to perform an exposure operation in such a manner that the distance to an object is measured upon the initial half stroke of a shutter release operation (the first stroke of a release button), a lens is driven upon the next half stroke of the shutter release button (second stroke) to be focused, and the shutter is thereafter opened to effect exposure. Such cameras have a drawback in that a substantially long time is required for driving the lens from the second stroke release operation to the start of actual photographing, and a desired rapid picture-taking performance cannot be achieved. A camera which performs distance measurement and subsequent lens driving based on the measurement upon the first stroke of a shutter release operation and opens the shutter upon the second stroke to effect exposure has therefore been proposed.

However, a distance measurement field is fixed in these conventional cameras, and no means has been devised to apply this distance measurement/exposure process to cameras capable of changing between a plurality of distance measurement fields and a single distance measurement field. Also, with respect to the photometry field, no rapid picture-taking cameras have been proposed by considering divided photometry areas and a central photometry area. Also, no rapid picture-taking cameras have been proposed by considering a red-eye-effect reducing illumination used in cameras lately put on the market.

SUMMARY OF THE INVENTION

An object of the present invention is to provide a camera capable of instantly taking a photograph by correctly focusing on a desired object when a rapid picture-taking exposure mode is selected.

To achieve this object, according to one aspect of the present invention, there is provided a camera comprising detection means for detecting at least one of information on the distance to an object and information on a defocus state in a detection field area, wherein the detection means can change the detection field area between a wide field area and a narrow field area, and changing means for changing the detection field area of the detection means to the narrow field area when a rapid picture-taking exposure mode is selected. Generally, in a rapid picture-taking exposure mode, it is natural to take a photograph while aiming at an image at the moment when the object image enters a left-hand or right-hand area of the field of view of the frame, or at the moment when the object image enters a central area of the frame, and focusing is automatically performed with respect to each of these areas.

Another object of the present invention is to provide a camera capable of instantly taking a photograph by performing correct exposure with respect to a desired object when a rapid picture-taking exposure mode is selected.

To achieve this object, according to another aspect of the present invention, there is provided a camera comprising photometry means for detecting photometry information in a photometry area, wherein the photometry means can change the photometry area between a wide field area and a narrow field area, and changing means for changing the photometry field area of the photometry means to the narrow field area when a rapid picture-taking exposure mode is selected. Generally, in a rapid picture-taking exposure mode, it is natural to take a photograph while aiming at an image at the moment when the object image enters a left-hand or right-hand area of the field of view of the frame, or at the moment when the object image enters a central area of the frame, and photometry is automatically performed with respect to each of these areas.

Still another object of the present invention is to provide a camera capable of photographing a desired object with an electronic flash without losing a rapid picture-taking effect when a rapid picture-taking exposure mode is selected.

To achieve this object, according to another aspect of the present invention, there is provided a camera comprising a red-eye-effect prevention illumination means for preventing a red-eye-effect, and limitation means for limiting the effect of the red-eye-effect prevention illumination means when a rapid picture-taking exposure mode is selected. Generally, in a rapid picture-taking exposure mode, it is natural to take a photograph while aiming at an image at the moment when the object image enters the field of view of the frame, and the time for illumination of the red-eye-effect prevention illumination means or the number of times of pre-lighting is limited to enable the photography process to rapidly proceed to exposure after the completion of the shutter release.

Other aspects of the present invention will become apparent from the following description of the preferred embodiments of the present invention.

DESCRIPTION OF THE PREFERRED EMBODIMENTS

Preferred embodiments of the present invention will be described with reference to the accompanying drawings.

Figure 1:
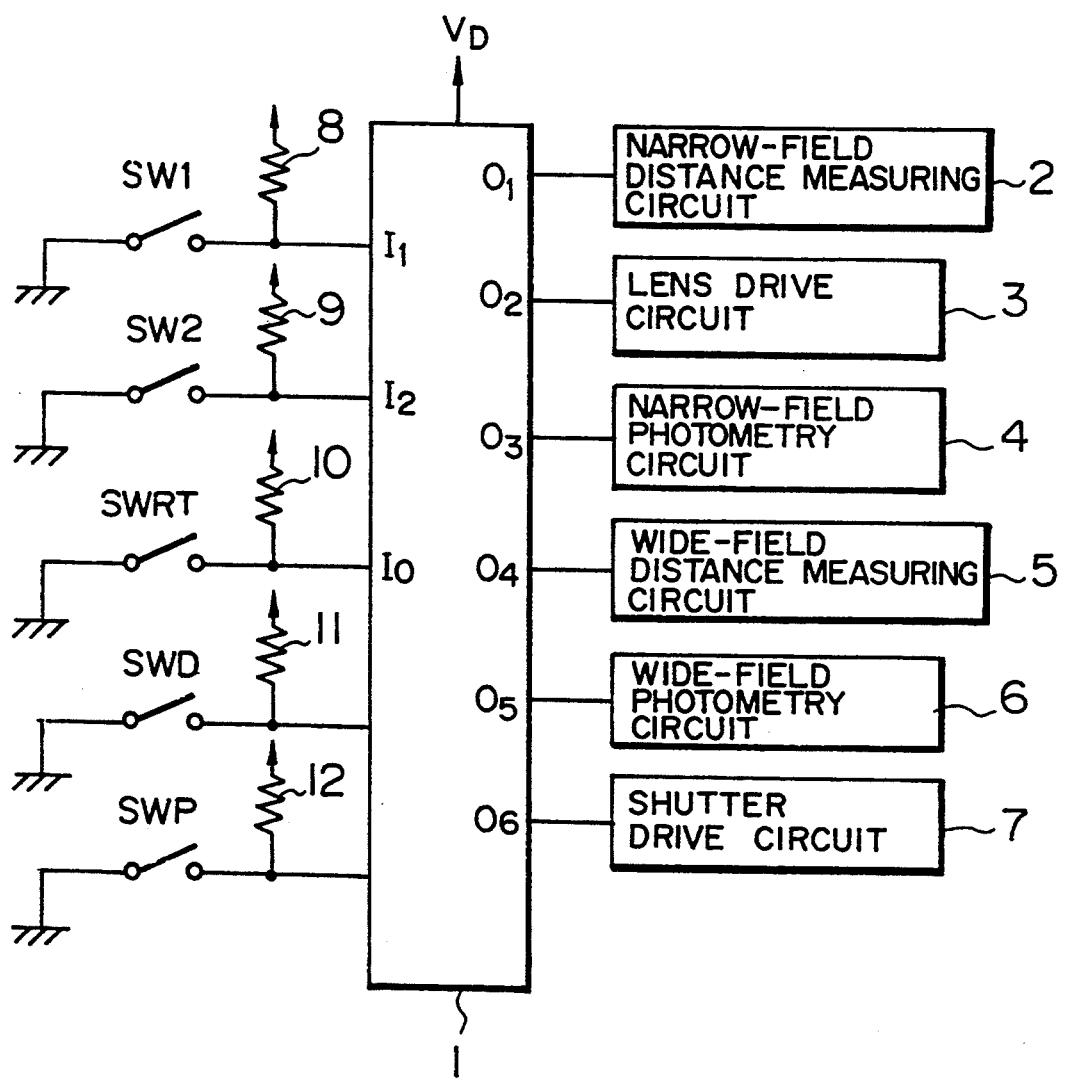
FIG. 1 is a schematic block diagram of a camera in accordance with a first embodiment of the present invention.

FIG. 1 is a block diagram of the structure of an important section of a camera in accordance with a first embodiment of the present invention. As shown in FIG. 1, the camera has a microcomputer 1 for controlling various camera operations, a narrow-field distance measuring circuit 2 for performing "distance measurement" in a narrow field in a field of view of the frame ("distance measurement" includes detection of a defocus state of an object and will be hereinafter referred to with the same meaning), a lens drive circuit 3 for driving and focusing a photographic lens (not shown), a narrow-field photometry circuit 4 for measuring the amount of light in the narrow field in the frame, a wide-field distance measuring circuit 5 for performing distance measurement in a wide field in the frame, a wide-field photometry circuit 6 for measuring the amount of light in the wide field in the frame, and a shutter drive circuit 7 for opening and closing a shutter. Switches SW1, SW2, SWRT, SWD, and SWP are provided. The switch SW1 is turned on by the first (half) stroke of a shutter release button, and the switch SW2 is turned on by the second (half) stroke of the release button. The switch SWRT is turned on when a later-described rapid picture-taking (RT) mode is set. The switch SWD is a distance measurement area selection switch for selecting distance measurement areas. The switch SWP is a photometry area selection switch for selecting photometry areas. Pull-up resistors 8 to 12 are also provided.

Figure 2:
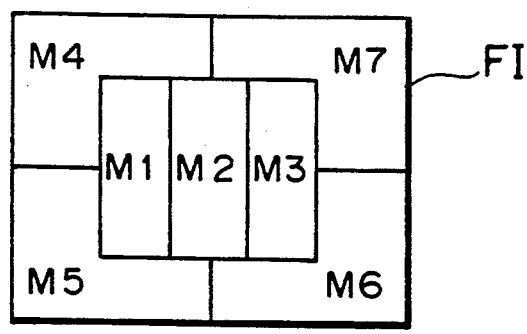
FIG. 2 is a diagram of photometry areas of the camera shown in FIG. 1.

FIG. 2 shows photometry areas of the camera in accordance with this embodiment.

In FIG. 2 are illustrated a view finder frame FI and photometry areas M1 to M7 which are defined by dividing the area of the frame and in each of which the amount of light is measured separately.

When the later-described RT mode is set, narrow-field photometry is automatically selected (as described later) to measure the amount of light in the photometry areas M1 to M3 at the center of the frame with the above-mentioned narrow-field photometry circuit 4. When an ordinary mode is set, wide-field photometry is automatically selected to perform an evaluation photometry with respect to all the photometry areas M1 to M7, using the above-mentioned wide-field photometry circuit 6.

This camera is designed so that, in the RT (rapid picture-taking) mode, a particular one of the photometry areas, e.g., the photometry area M1, can be externally selected as a narrow field by operating the switch SWP.

Figure 3:
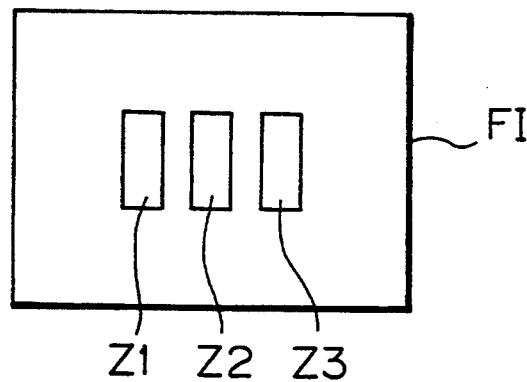
FIG. 3 is a diagram of distance measurement areas of the camera shown in FIG. 1.

FIG. 3 shows distance measurement areas of the camera in accordance with this embodiment.

As shown in FIG. 3, distance measurement areas Z1 to Z3 are defined in the above-mentioned finder frame FI, and distance measurement is performed with respect to each of the distance measurement areas Z1 to Z3.

When the later-described RT mode is set, narrow-field distance measurement is automatically selected (as described later) to perform distance measurement, for example, in the distance measurement area Z2 at the center of the frame with the above-mentioned narrow-field distance measuring circuit 2. When the ordinary mode is set, wide-field distance measurement is automatically selected to perform an evaluation distance measurement with respect to all the distance measurement areas Z1 to Z3, by the above-mentioned wide-field distance measuring circuit 5.

This camera is designed so that, in the RT mode, a particular one of the distance measurement areas, e.g., the distance measurement area Z1, can be externally selected as a narrow field by operating the switch SWD.

The thus-arranged camera is capable of selecting one of two exposure modes: the rapid picture-taking exposure mode, i.e., RT mode, in which the operation of previously measuring the distance to an object corresponding to the position in the view frame where a desired object is supposed to be reached and the operation of previously moving the lens to the corresponding focused position thereby determined are performed by the first stroke of the release button, and photometry and a shutter opening-closing control (exposure operation) are thereafter performed by the second stroke of the release button when the desired position in the view frame is reached by the object; and the ordinary exposure mode in which photometry and distance measuring are performed by the first stroke of the release button and the operation of driving the lens based on the distance measurement information and the operation of opening and closing the shutter are thereafter performed by the second stroke of the release button.

Figure 4:
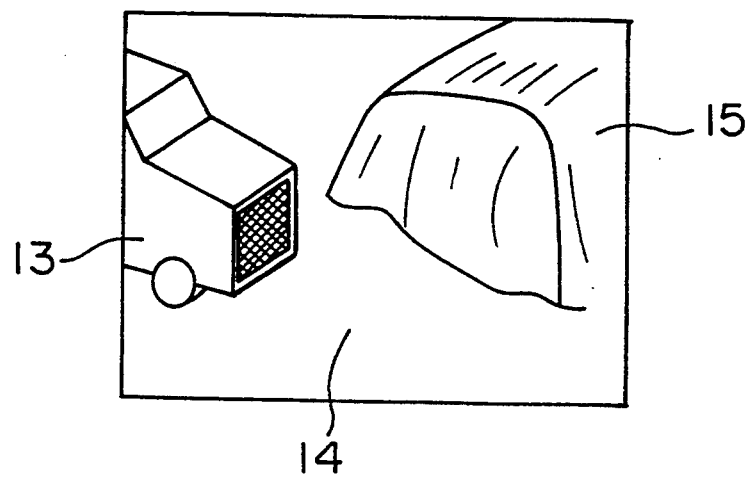
FIG. 4 is a diagram of a photography operation in a rapid picture-taking mode using the camera shown in FIG. 1.

The operation of the camera performed when the RT mode is selected will be described below with respect to a photographic scene shown in FIG. 4. In FIG. 4 are illustrated a motor vehicle 13 which is the object of photography, ground 14, and a background rock 15.

First, a photographer turns on the switch SWRT to set the exposure mode to the RT mode, selects the photometry area M1 by the photometry area selection switch SWP, and selects the distance measurement area Z1 by the distance area selection switch SWD. If only the RT mode is set, and no selection is made, certain narrow field areas, i.e., photometry areas M1 to M3 and distance measurement area Z2 are automatically set. Next, distance measuring with respect to the distance measurement area Z1 and lens driving based on this distance measurement are performed by the first stroke of the release button to shoot the motor vehicle 13. At this time, assume that the vehicle has not reached the desired position in the frame (a position in the distance measurement area Z1). Therefore, the distance measurement area Z1 is set so as to cover an object at the same distance as the motor vehicle 13, e.g., ground 14, before the release button is operated through the first stroke. Thereafter, when the vehicle 13 enters a left-hand area in the frame as shown in FIG. 4, the release button is operated through the second stroke. Photometry with respect to the selected photometry area M1 is thereby performed and a shutter opening/closing control based on a photometric value obtained by this photometry, i.e., exposure operation, is performed.

Photographing of the motor vehicle with correct focusing and exposure is instantly enabled in this manner.

Figure 5:
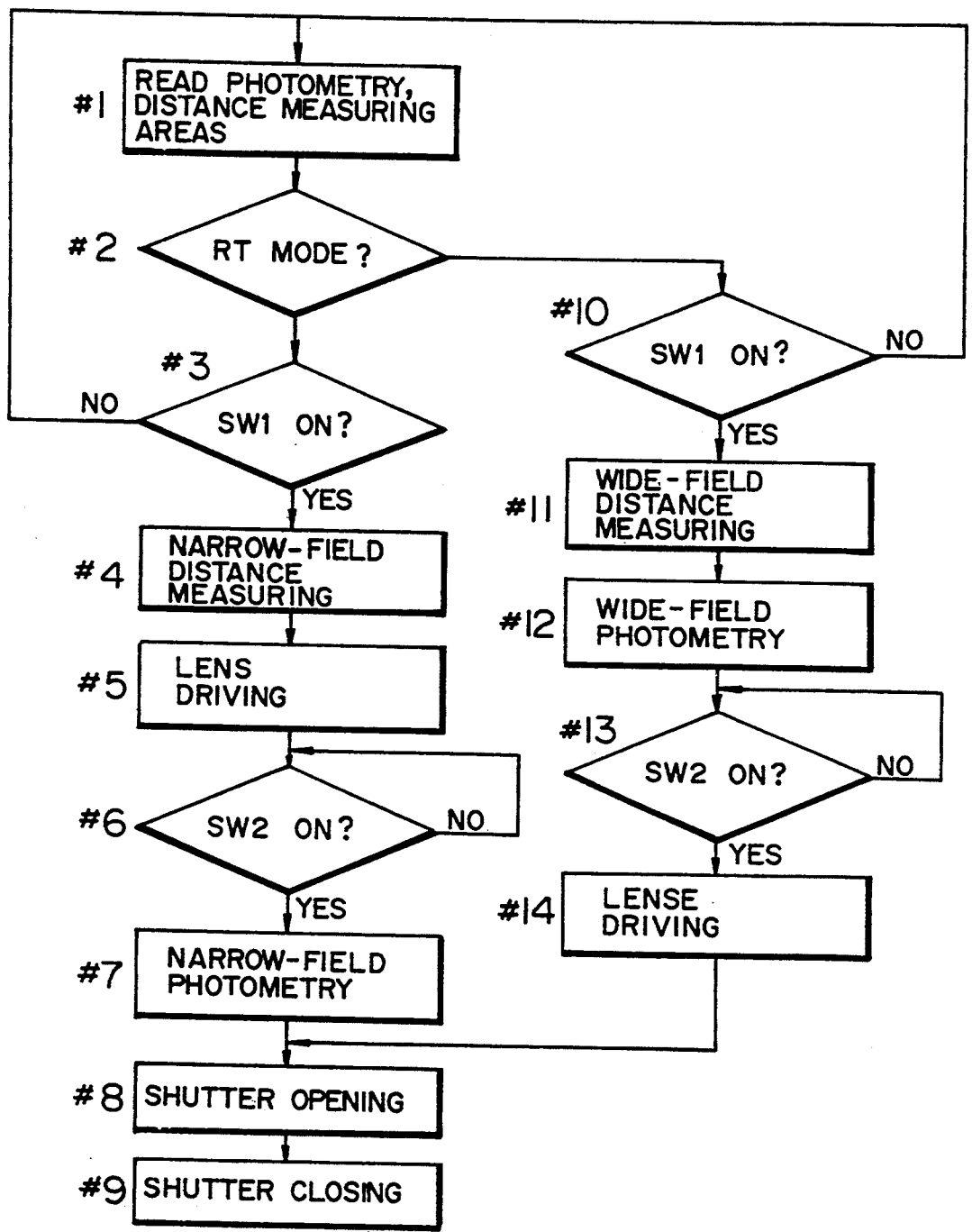
FIG. 5 is a flowchart of the operation of the microcomputer shown in FIG. 1.

The operation of the microcomputer 1 will be described below with reference to the flowchart of FIG. 5.

A power supply voltage VD is applied to the microcomputer 1 by turning on an unillustrated power switch of the camera, thereby starting the operation from step 1.

[Step 1]

In a case where a particular one of the photometry areas M1 to M7 and a particular one of the distance measurement areas Z1 to Z3 have been selected by the photometry area selection switch SWP and the distance measuring selection switch SWD, these areas are read and the process proceeds to step 2.

[Step 2]

A determination is made as to whether the exposure mode of the camera is the RT mode or the ordinary exposure mode from the state of the switch SWRT. The process proceeds to step 3 in the case of the RT mode or to step 10 in the case of the ordinary exposure mode.

[Step 3]

A determination is made as to whether or not the release button has been operated through the first stroke to turn on the switch SW1. If NO, the process returns to step 1. The process proceeds to step 4 if the on-state of the switch SW1 is confirmed.

[Step 4]

Since the present exposure mode is the RT mode, it is recognized, with respect to the determination in step 3, that the first stroke operation has been performed while an object which is supposed to be at the same distance from the camera as the distance at the time when the object image, not presently seen in the frame, enters the frame and is placed at the desired position in the frame, i.e., in the selected one of the distance measurement areas recognized in step 1, or at the center of the frame in a case where no selected distance measurement area has been recognized in step 1. In step 4, the distance measuring operation is performed by the narrow-field distance measuring circuit 2 with respect to this narrow-field distance measurement area.

[Step 5]

The lens drive circuit 3 is energized to drive the lens, i.e., to focus the unillustrated lens on the basis of the distance measurement information obtained in step 4.

[Step 6]

A determination is made as to whether or not the release button has been operated through the second stroke to turn on the switch SW2. If NO, the release button second-stroke operation is awaited. The process proceeds to step 7 if the on-state of the switch SW2 is confirmed.

[Step 7]

Since the present exposure mode is the RT mode, it is recognized, with respect to the determination in step 6, that the second stroke operation has been performed with the object image reaching the desired position in the frame, i.e., the selected one of the photometry areas recognized in step 1, or the center of the frame in a case where no selected photometry area has been recognized in step 1. In step 7, the photometry operation is performed by energizing the narrow-field photometry circuit 4 with respect to this narrow-field photometry area.

[Step 8]

The shutter drive circuit 7 is energized to open the unillustrated shutter.

[Step 9]

The shutter drive circuit 7 is energized to close the unillustrated shutter after the time period determined by the photometry information obtained in step 7, thereby terminating the exposure operation.

If it is determined in step 2 that the exposure mode of the camera is not the RT mode but the ordinary exposure mode, the process proceeds to step 10 as mentioned above.

[Step 10]

A determination is made as to whether or not the release button has been operated through the first stroke to turn on the switch SW1. If NO, the process returns to step 1. The process proceeds to step 11 if the on-state of the switch SW1 is confirmed.

[Step 11]

Since the present exposure mode is the ordinary exposure mode, the wide-field distance measuring circuit 5 is energized to perform the distance measuring operation with respect to each of the distance measurement areas Z1 to Z3.

[Step 12]

Since the present exposure mode is the ordinary exposure mode, the wide-field photometry circuit 6 is energized to perform the photometry operation with respect to each of the photometry areas M1 to M7.

[Step 13]

A determination is made as to whether or not the release button has been operated through the second stroke to turn on the switch SW2. If NO, the release button second-stroke operation is awaited. The process proceeds to step 14 if the on-state of the switch SW2 is confirmed.

[Step 14]

The lens drive circuit 3 is energized to drive the lens, i.e., to focus the unillustrated lens on the basis of the distance measurement information obtained in step 11. Thereafter, the process proceeds to perform the operation of step 8 and the subsequent steps, i.e., to perform the shutter opening/closing operations.

In this embodiment, in a case where the RT mode enabling the desired rapid picture-taking performance is set as an exposure mode, narrow-field distance measurement is performed by the first stroke of the release button, and the lens is driven on the basis of the result of this measurement. Thereafter, narrow-field photometry is performed by the subsequent second stroke operation of the release button, and shutter opening/closing operations are performed on the basis of this photometry. Thus, rapid photography with correct focusing and correct exposure to any object can be achieved.

Figure 6:
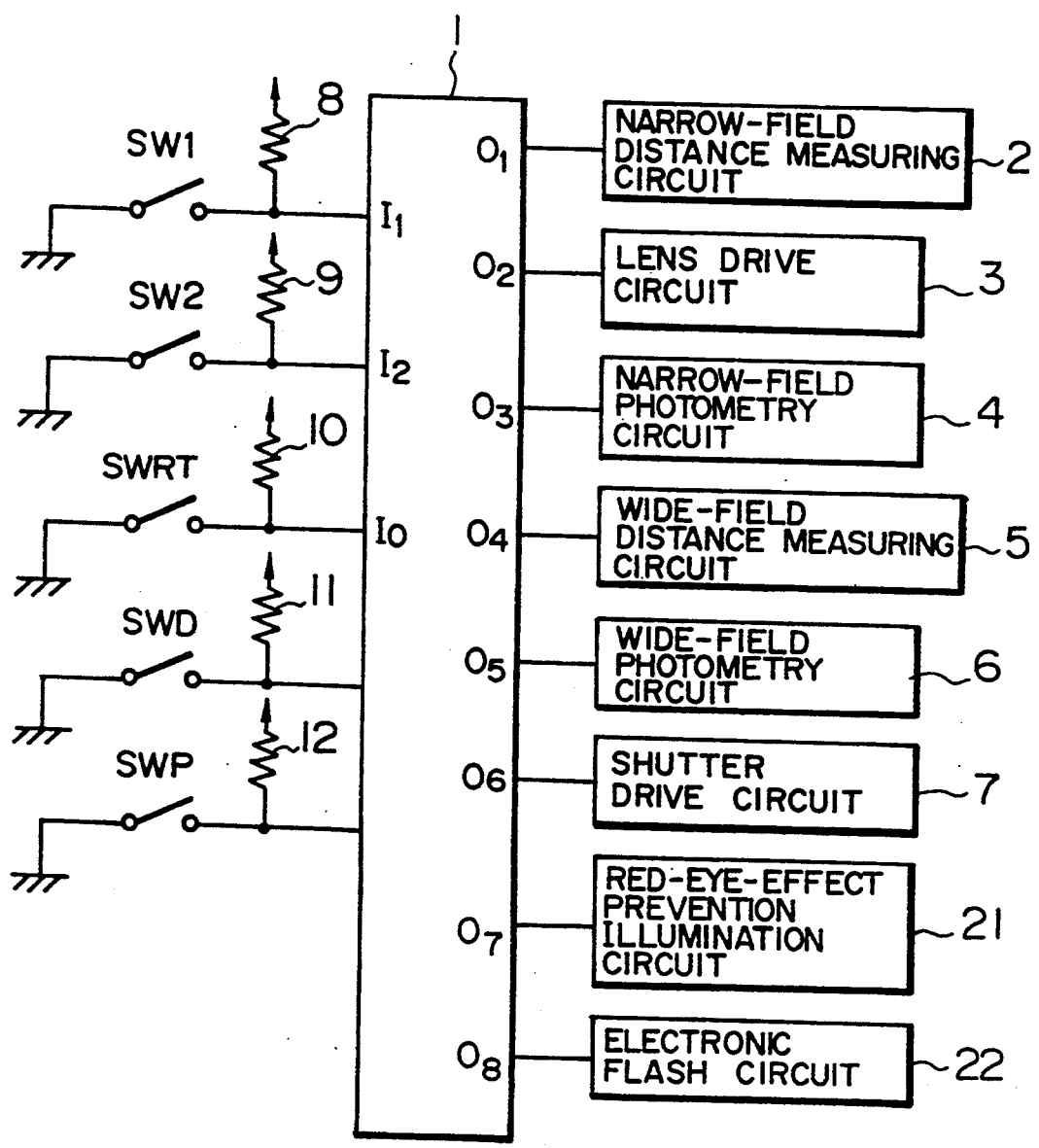
FIG. 6 is a schematic block diagram of the construction of a camera in accordance with a second embodiment of the present invention.

FIG. 6 is a block diagram schematically showing the construction of a camera in accordance with a second embodiment of the present invention. Components identical to those shown in FIG. 1 are indicated by the same reference characters, and a detailed description of them will not be repeated.

As shown in FIG. 6, a red-eye-effect prevention circuit 21 is provided. This circuit is used before the flash to reduce the red-eye effect by emitting illumination light so that the pupils of a subject's eyes are closed to a certain extent, in a case where the photometry circuit 4 or 6 determines that a measured luminance is so low that electronic flash is required. In this embodiment, however, this red-eye-effect prevention illumination is not performed in the RT mode by considering the rapid picture-taking effect, as described later. A block 22 represents a well-known electronic flash circuit.

Figure 7:
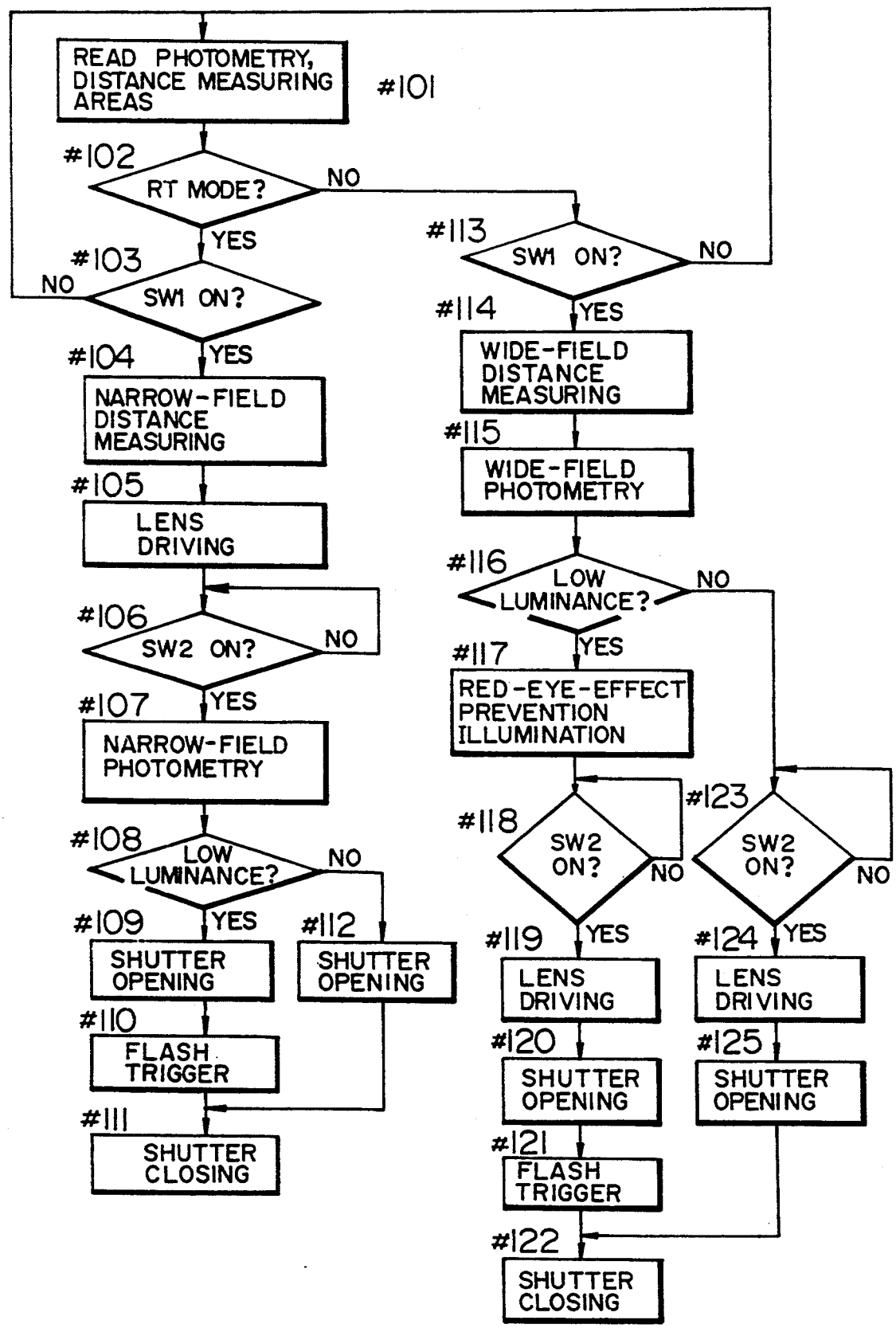
FIG. 7 is a flowchart of the operation of the microcomputer shown in FIG. 6.

The operation of the microcomputer 1 in the arrangement shown in FIG. 6 will be described below with reference to the flowchart of FIG. 7.

A power supply voltage $V_D$ is applied to the microcomputer 1 by turning on an unillustrated power switch of the camera, thereby starting the operation from step 101.

[Step 101]

In a case where a particular one of the photometry areas M1 to M7 and a particular one of the distance measurement areas Z1 to Z3 have been selected by the photometry area selection switch SWP and the distance measuring selection switch SWD, these areas are read and the process proceeds to step 102.

[Step 102]

A determination is made as to whether the exposure mode of the camera is the RT mode or the ordinary exposure mode from the state of the switch SWRT. The process proceeds to step 103 in the case of the RT mode or to step 113 in the case of the ordinary exposure mode.

[Step 103]

A determination is made as to whether or not the release button has been operated through the first stroke to turn on the switch SW1. If NO, the process returns to step 101. The process proceeds to step 104 if the on-state of the switch SW1 is confirmed.

[Step 104]

Since the present exposure mode is the RT mode, it is recognized, with respect to the determination in step 103, that the first stroke operation has been performed while an object which is supposed to be at the same distance from the camera as the distance at the time when the object image, not presently seen in the frame, enters the frame is placed at the desired position in the frame, that is, in the selected one of the distance measurement areas recognized in step 101, or at the center of the frame in a case where no selected distance measurement areas has been recognized in step 101. In step 104, the distance measuring operation is performed by the narrow-field distance measuring circuit 2 with respect to this narrow-field distance measurement area.

[Step 105]

The lens drive circuit 3 is energized to drive the lens, i.e., to focus the unillustrated lens on the basis of distance measurement information obtained in step 104.

[Step 106]

A determination is made as to whether or not the release button has been operated through the second stroke to turn on the switch SW2. If NO, the release button second-stroke operation is awaited. The process proceeds to step 107 if the on-state of the switch SW2 is confirmed.

[Step 107]

Since the present exposure mode is the RT mode, it is recognized, with respect to the determination in step 106, that the second stroke operation has been performed with the object image reaching the desired position in the frame, i.e., the selected one of the photometry areas recognized in step 101, or the center of the frame in a case where no selected photometry area has been recognized in step 101. In step 107, the photometry operation is performed by energizing the narrow-field photometry circuit 4 with respect to this narrow-field photometry area.

[Step 108]

A determination is made on the basis of photometry information obtained in step 107 as to whether the measured luminance is so low that an electronic flash is required. The process proceeds to step 109 if YES, or to step 112 if NO.

[Step 109]

The shutter drive circuit 7 is energized to open the unillustrated shutter.

[Step 110]

The electronic flash circuit 22 is energized to trigger the electronic flash.

[Step 111]

The shutter drive circuit 7 is energized to close the unillustrated shutter after the time period determined by the photometry information obtained in step 107, thereby terminating the exposure operation using the electronic flash.

If it is determined in step 108 that the luminance is sufficiently high, the process proceeds to step 112 as mentioned above.

[Step 112]

The shutter drive circuit 7 is energized to open the unillustrated shutter, and the process then proceeds to the above-described step 111 to perform the shutter closing operation as described above. In this case, the electronic flash is not used.

If it is determined in step 102 that the exposure mode of the camera is not the RT mode but the ordinary exposure mode, the process proceeds to step 113 as mentioned above.

[Step 113]

A determination is made as to whether or not the release button has been operated through the first stroke to turn on the switch SW1. If NO, the process returns to step 101. The process proceeds to step 114 if the on-state of the switch SW1 is confirmed.

[Step 114]

Since the present exposure mode is the ordinary exposure mode, the wide-field distance measuring circuit 5 is energized to perform the distance measuring operation with respect to each of the distance measurement areas Z1 to Z3.

[Step 115]

Since the present exposure mode is the ordinary exposure mode, the wide-field photometry circuit 6 is energized to perform the photometry operation with respect to each of the photometry areas M1 to M7.

[Step 116]

A determination is made on the basis of photometry information obtained in step 115 as to whether the measured luminance is so low that the electronic flash is required. The process proceeds to step 117 if YES, or to step 123 if NO.

[Step 117]

The red-eye-effect prevention illumination circuit 21 is energized to emit illumination light to the object.

[Step 118]

A determination is made as to whether or not the release button has been operated through the second stroke to turn on the switch SW2. If NO, the release button second-stroke operation is awaited. The process proceeds to step 119 if the on-state of the switch SW2 is confirmed.

[Step 119]

The lens drive circuit 3 is energized to drive the lens, i.e., to focus the unillustrated lens on the basis of distance measurement information obtained in step 114.

[Step 120]

The shutter drive circuit 7 is energized to open the unillustrated shutter.

[Step 121]

The electronic flash circuit 22 is energized to trigger the electronic flash.

[Step 122]

The shutter drive circuit 7 is energized to close the unillustrated shutter after the time period determined by the photometry information obtained in step 115, thereby terminating the exposure operation using the electronic flash.

If it is determined in step 116 that the luminance is sufficiently high, the process proceeds to step 123 as mentioned above.

[Step 123]

A determination is made as to whether or not the release button has been operated through the second stroke to turn on the switch SW2. If NO, the second-stroke release button operation is awaited. The process proceeds to step 124 if the on-state of the switch SW2 is confirmed.

[Step 124]

The lens drive circuit 3 is energized to drive the lens, i.e., to focus the unillustrated lens on the basis of distance measurement information obtained in step 114.

[Step 125]

The shutter drive circuit 7 is energized to open the unillustrated shutter. The process then proceeds to step 122 to perform the shutter closing operation as described above.

In this embodiment, in a case where the RT mode is set as an exposure mode, narrow-field distance measurement is performed by the first stroke of the release button, and the lens is driven on the basis of the result of this measurement. Thereafter, narrow-field photometry is performed by the subsequent second stroke operation of the release button to perform shutter opening/closing operations and electronic flash operations based on the result of this photometry without performing red-eye-effect prevention illumination even if the measured luminance is so low that there is a need for electronic flash. Thus, electronic-flash photography capable of correct focusing object and with correct exposure and having a desired rapid picture-taking effect to any object can be achieved, although there is a possibility of the occurrence of the red-eye phenomenon.

Figure 8:
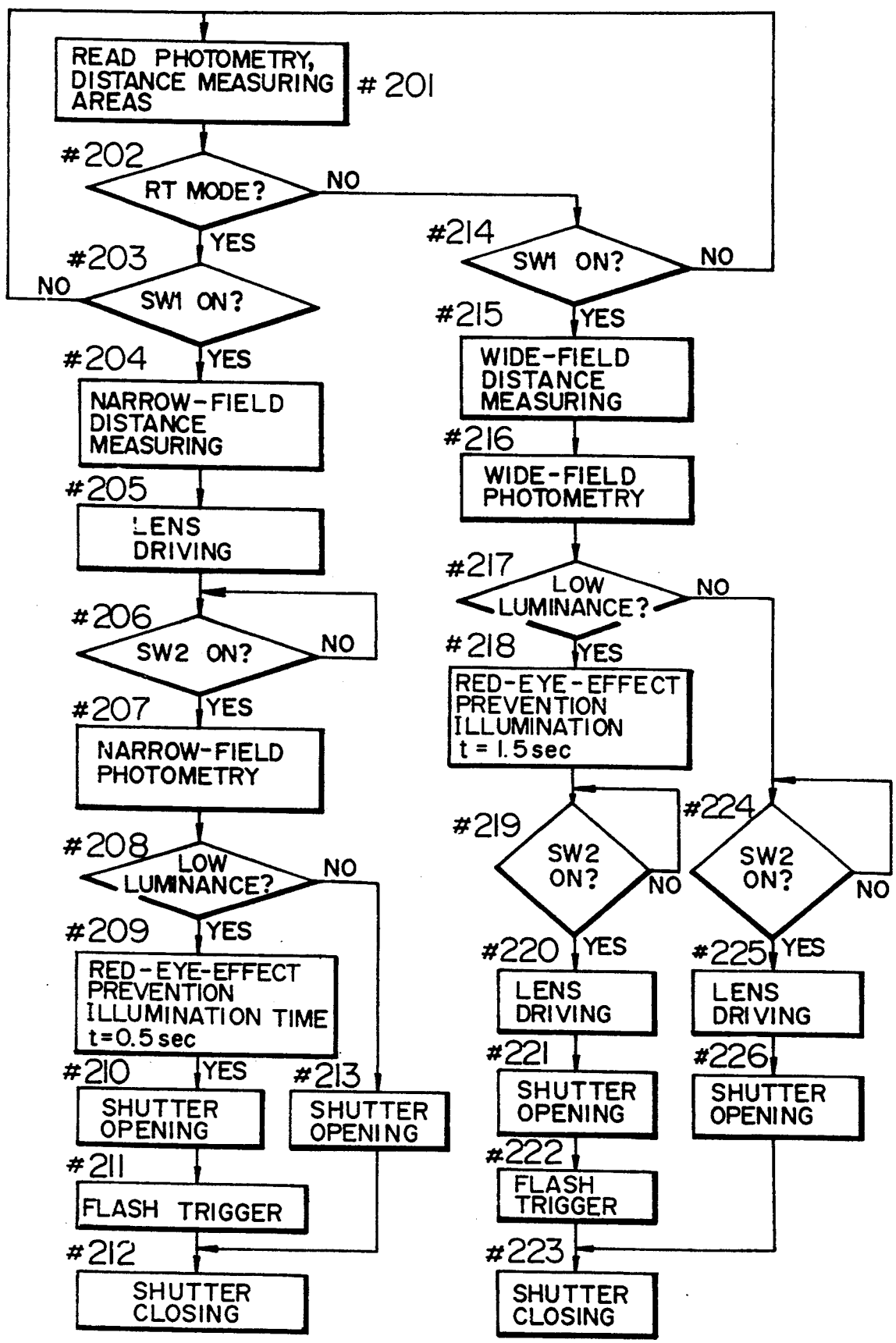
FIG. 8 is a flowchart of the operation of a microcomputer in accordance with a third embodiment of the present invention.

FIG. 8 is a flowchart showing the operation of a camera in accordance with a third embodiment of the present invention. The operation of the third embodiment will be described below with reference to FIG. 8. The construction of this camera is substantially the same as that of the second embodiment and the description for it will not be repeated.

A power supply voltage $V_D$ is applied to the microcomputer 1 by turning on an unillustrated power switch of the camera, thereby starting the operation from step 201.

[Step 201]

In a case where a particular one of the photometry areas M1 to M7 and a particular one of the distance measurement areas Z1 to Z3 have been selected by the photometry area selection switch SWP and the distance measuring selection switch SWD, these areas are read and the process proceeds to step 202.

[Step 202]

A determination is made as to whether the exposure mode of the camera is the RT mode or the ordinary exposure mode from the state of the switch SWRT. The process proceeds to step 203 in the case of the RT mode or to step 214 in the case of the ordinary exposure mode.

[Step 203]

A determination is made as to whether or not the release button has been operated through the first stroke to turn on the switch SW1. If NO, the process returns to step 201. The process proceeds to step 204 if the on-state of the switch SW1 is confirmed.

[Step 204]

Since the present exposure mode is the RT mode, it is recognized, with respect to the determination in step 203, that the first stroke operation has been performed while an object which is supposed to be at the same distance from the camera as the distance at the time when the object image, not presently seen in the frame, enters the frame is placed at the desired position in the frame, that is, in the selected one of the distance measurement areas recognized in step 201, or at the center of the frame in a case where no selected distance measurement area has been recognized in step 201. In step 204, the distance measuring operation is performed by the narrow-field distance measuring circuit 2 with respect to this narrow-field distance measurement area.

[Step 205]

The lens drive circuit 3 is energized to drive the lens, i.e., to focus the unillustrated lens on the basis of distance measurement information obtained in step 204.

[Step 206]

A determination is made as to whether or not the release button has been operated through the second stroke to turn on the switch SW2. If NO, the release button second-stroke operation is awaited. The process proceeds to step 207 if the on-state of the switch SW2 is confirmed.

[Step 207]

Since the present exposure mode is the RT mode, it is recognized, with respect to the determination in step 206, that the second stroke operation has been performed with the object image reaching the desired position in the frame, i.e., the selected one of the photometry areas recognized in step 201, or the center of the frame in a case where no selected photometry area has been recognized in step 201. In step 207, the photometry operation is performed by energizing the narrow-field photometry circuit 4 with respect to this narrow-field photometry area. 10

[Step 208]

A determination is made on the basis of photometry information obtained in step 207 as to whether the measured luminance is so low that the electronic flash is required. The process proceeds to step 209 if YES, or to step 213 if NO. 15

[Step 209]

The red-eye-effect prevention illumination circuit 21 is energized to emit illumination light to the object for 0.5 sec. This illumination time in the RT mode is shorter than the illumination time in the ordinary exposure mode in the case of step 218 described later.

[Step 210]

The shutter drive circuit 7 is energized to open the unillustrated shutter.

[Step 211]

The electronic flash circuit 22 is energized to trigger the electronic flash.

[Step 212]

The shutter drive circuit 7 is energized to close the unillustrated shutter after the time period determined by the photometry information obtained in step 207, thereby terminating the exposure operation using the electronic flash.

If it is determined in step 208 that the luminance is sufficiently high, the process proceeds to step 213 as mentioned above.

[Step 213]

The shutter drive circuit 7 is energized to open the unillustrated shutter, and the process then proceeds to the above-described step 212 to perform the shutter closing operation as described above. In this case, the electronic flash is not used.

If it is determined in step 202 that the exposure mode of the camera is not the RT mode but the ordinary exposure mode, the process proceeds to step 214 as mentioned above.

[Step 214]

A determination is made as to whether or not the release button has been operated through the first stroke to turn on the switch SW1. If NO, the process returns to step 201. The process proceeds to step 215 if the on-state of the switch SW1 is confirmed. 2O

[Step 215]

Since the present exposure mode is the ordinary exposure mode, the wide-field distance measuring circuit 5 is energized to perform the distance measuring operation with respect to each of the distance measurement areas Z1 to Z3. 25

[Step 216]

Since the present exposure mode is the ordinary exposure mode, the wide-field photometry circuit 6 is energized to perform the photometry operation with respect to each of the photometry areas M1 to M7.

[Step 217]

A determination is made on the basis of photometry information obtained in step 216 as to whether the measured luminance is so low that the electronic flash is required. The process proceeds to step 218 if YES, or to step 224 if NO.

[Step 218]

The red-eye-effect prevention illumination circuit 21 is energized to emit illumination light to the object for 1.5 sec, a time long enough to suitably reduce the red-eye effect. That is, the illumination for reducing the red-eye effect is performed for a period of time thrice the illumination time in the RT mode.

[Step 219]

A determination is made as to whether or not the release button has been operated through the second stroke to turn on the switch SW2. If NO, the release button second-stroke operation is awaited. The process proceeds to step 220 if the on-state of the switch SW2 is confirmed.

[Step 220]

The lens drive circuit 3 is energized to drive the lens, i.e., to focus the unillustrated lens on the basis of the distance measurement information obtained in step 215.

[Step 221]

The shutter drive circuit 7 is energized to open the unillustrated shutter.

[Step 222]

The electronic flash circuit 22 is energized to trigger the electronic flash.

[Step 223]

The shutter drive circuit 7 is energized to close the unillustrated shutter after the time period determined by the photometry information obtained in step 216, thereby terminating the exposure operation using the electronic flash.

If it is determined in step 217 that the luminance is sufficiently high, the process proceeds to step 224 as mentioned above.

[Step 224]

A determination is made as to whether or not the release button has been operated through the second stroke to turn on the switch SW2. If NO, the second-stroke release button operation is awaited. The process proceeds to step 225 if the on-state of the switch SW2 is confirmed.

[Step 225]

The lens drive circuit 3 is energized to drive the lens, i.e., to focus the unillustrated lens on the basis of the distance measurement information obtained in step 215.

[Step 226]

The shutter drive circuit 7 is energized to open the unillustrated shutter. The process then proceeds to step 223 to perform the shutter closing operation as described above.

In this embodiment, in a case where the RT mode is set as an exposure mode, narrow-field distance measurement is performed by the first stroke of the release button, and the lens is driven on the basis of the result of this measurement. Narrow-field photometry is then performed by the subsequent second stroke operation of the release button, and red-eye-effect prevention illumination is performed only for a short time if the measured luminance is so low that there is a need for the electronic flash. Thereafter, the shutter opening/closing operations and the electronic flash operation are performed on the basis of the photometry value. It is thus possible to achieve electronic-flash photography capable of correctly focusing on any object with the correct exposure and being free from any considerable red-eye effect while having a suitable rapid picture-taking capability.

In the third embodiment, the red-eye-effect prevention illumination circuit 21 is driven to effect red-eye-effect prevention illumination when the RT mode is selected. The electronic flash may be used for this illumination, and the number of times of electronic flashing in the RT mode may be reduced in comparison with the electronic flashing in the ordinary exposure mode.

The individual components shown in schematic or block form in the Drawings are all well-known in the camera arts and their specific construction and operation are not critical to the operation or best mode for carrying out the invention.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera having a selectable rapid picture-taking exposure mode, and using a red-eye-effect prevention means for preventing a red-eye-effect, comprising:
    a changing device for changing an operation of said red-eye-effect prevention means in accordance with the rapid picture-taking exposure mode.

2. A camera according to claim 1, wherein said changing device comprises means for limiting the operation of said red-eye-effect prevention means in accordance with the rapid picture-taking exposure mode.

3. A camera according to claim 2, wherein said limiting means includes means for reducing a time for illumination of said red-eye-effect prevention means.

4. A camera according to claim 2, wherein said limiting means includes means for inhibiting the operation of said red-eye-effect prevention means.

5. A camera according to claim 2, wherein said limiting means includes means for reducing a number of times of illumination of said red-eye-effect prevention means.

6. A camera having a selectable rapid picture-taking exposure mode, comprising:
   detection means for detecting at least one of distance information on an object and defocus information on the object; and
   changing means for setting an operation of said detection means in accordance with the rapid picture-taking exposure mode.

7. A camera according to claim 6, further comprising photographing optical unit to operate sequentially after a detection operation of said detection means and in accordance with the rapid picture-taking exposure mode.

8. A camera according to claim 6, further comprising photographing optical unit operating means for causing a photographing optical unit to operate in response to a stroke operation of a shutter release button and in accordance with the rapid picture-taking exposure mode, said stroke operation also actuating side detection means.

9. A camera according to claim 6, further comprising:
   red-eye-effect prevention means for preventing a red-eye effect; and
   limitation means for limiting an operation of said red-eye-effect prevention means in accordance with the rapid picture-taking exposure mode.

10. A camera according to claim 9, wherein said limitation means includes means for reducing a time for illumination of said red-eye-effect prevention means.

11. A camera according to claim 9, wherein said limitation means includes means for inhibiting the operation of said red-eye-effect prevention means.

12. A camera according to claim 9, wherein said limitation means includes means for reducing a number of times of illumination of said red-eye-effect prevention means.

13. A camera according to claim 6, further comprising:
   red-eye-effect prevention means for preventing a red-eye-effect; and
   second changing means for changing an operation of said red-eye-effect prevention means in accordance with the rapid picture-taking exposure mode.

14. A camera according to claim 6, wherein said changing means includes means for setting a detection area of said detection means in accordance with the rapid picture-taking exposure mode.

15. A camera according to claim 14 wherein said changing means includes means for setting the detection area of said detection means to a small area substantially at a center of a view frame in accordance with the rapid picture-taking exposure mode.

16. A camera according to claim 14, wherein said changing means includes means for setting the detection area of said detection means between a large area and a small area.

17. A camera according to claim 16, wherein, said changing means comprises means for setting the detection area of said detection means to the small area in accordance with the rapid picture-taking exposure mode.

18. A camera according to claim 16, wherein said changing means includes means for selecting a position of the small detection area.

19. A camera according to claim 16, wherein said changing means includes means for designating one of a plurality of detection areas as said small area.

20. A camera according to claim 6, further comprising:
   a photometry means for detecting photometry information; and
   second changing means for setting an operation of said photometry means in accordance with the rapid picture-taking exposure mode.

21. A camera according to claim 20, further comprising exposure means for performing an exposure operation sequentially after a photometry operation of said photometry means and in accordance with the rapid picture-taking exposure mode.

22. A camera according to claim 20, wherein said photometry means includes means for performing a photometry operation in accordance with the rapid picture-taking exposure mode and in response to a stroke operation of a shutter release button, said stroke operation also actuating an exposure operation.

23. A camera according to claim 20, further comprising:
   red-eye-effect prevention means for preventing a red-eye effect; and
   limitation means for limiting an operation of said red-eye-effect prevention means in accordance with the rapid picture-taking exposure mode.

24. A camera according to claim 23, wherein said limitation means includes means for reducing a time for illumination of said red-eye-effect prevention means.

25. A camera according to claim 23, wherein said limitation means includes means for inhibiting the operation of said red-eye-effect prevention means.

26. A camera according to claim 23, wherein said limitation means includes means for reducing a number of times of illumination of said red-eye-effect prevention means.

27. A camera according to claim 20, further comprising:
   red-eye-effect prevention means for preventing a red-eye-effect; and
   third changing means for changing an operation of said red-eye-effect prevention means in accordance with the rapid picture-taking exposure mode.

28. A camera according to claim 20, wherein said second changing means includes means for setting a photometry area of said photometry means in accordance with the rapid picture-taking exposure mode.

29. A camera according to claim 28, wherein said second changing means includes means for setting the photometry area of said photometry means to a small photometry area substantially at a center of a view frame in the rapid picture-taking exposure mode.

30. A camera according to claim 28 wherein said second changing means includes means for changing the photometry area of said photometry means between a large area and a small area.

31. A camera according to claim 30, wherein said second changing means including means for setting the photometry area of said photometry means to the, small photometry area in accordance with the rapid picture-taking exposure mode.

32. A camera according to claim 30 wherein said second changing means includes means for selecting a position of the small photometry area.

33. A camera according to claim 30, wherein said second changing means includes means for designating one of a plurality of photometry areas as said small photometry area.

34. A camera having selectable rapid picture-taking exposure mode, comprising:
   photometry means for detecting photometry information; and
   changing means for setting an operation of said photometry means in accordance with the rapid picture-taking exposure mode.

35. A camera according to claim 34, further comprising exposure means for performing an exposure operation subsequent to a photometry operation of said photometry means in accordance with the rapid picture-taking exposure mode.

36. A camera according to claim 34, wherein photometry means includes means for performing a photometry operation in accordance with the the rapid picture-taking exposure mode and in response to a stroke operation of a shutter release button, said stroke operation also actuating an exposure operation.

37. A camera according to claim 34, wherein said changing means including means for setting a photometry area of said photometry means in accordance with the rapid picture-taking exposure mode.

38. A camera according to claim 37, wherein said changing means includes means for setting the photometry area of said photometry means to a small photometry area substantially at a center of a view frame in accordance with the rapid picture-taking exposure mode.

39. A camera according to claim 37, wherein said changing means includes means for changing the photometry area of said photometry means between a large area and a small area.

40. A camera according to claim 39, wherein said changing means comprises means for setting the photometry area of said photometry means to the small photometry area in accordance with the rapid picture-taking exposure mode.

41. A camera according to claim 39, wherein said changing means includes means for selecting a position of the small photometry area.

42. A camera according to claim 39, wherein said changing means includes means for designating one of a plurality of photometry field areas as said small photometry field area.

43. A camera according to claim 39, further comprising:
   red-eye-effect prevention means for preventing a red-eye-effect; and
   limitation means for limiting an operation of said red-eye-effect prevention means in accordance with the rapid picture-taking exposure mode.

44. A camera according to claim 43, wherein said limitation means includes means for reducing a time for illumination of said red-eye-effect prevention means.

45. A camera according to claim 43, wherein said limitation means includes means for inhibiting the operation of said red-eye-effect prevention means.

46. A camera according to claim 43, wherein said limitation means includes means for reducing a number of times of illumination of said red-eye-effect prevention means.

47. A camera according to claim 39 further comprising:
   red-eye-effect prevention means for preventing a red-eye-effect; and
   second changing means for changing an operation of said red-eye-effect prevention means in accordance with the rapid picture-taking exposure mode.

48. A camera using red-eye-effect prevention means for preventing a red-eye-effect and detection means for detecting at least one of distance information on an object and defocus information on the object, said camera comprising:
   a relating device for relating an operation of said red-eye-effect prevention means with an operation of said detection means.

49. A camera according to claim 48, wherein said relating device comprises means for relating a change-over of said red-eye-effect prevention means and a change-over of said detection means.

50. A camera according to claim 48, wherein said relating device comprises means for relating a change-over of said red-eye-effect prevention means and a detection area change-over of said detection means.

51. A camera according to claim 48, wherein said relating device comprises means for relating a change-over of said red-eye-effect prevention means and a change-over of said detection means between a large detection area and a small detection area.

52. A camera according to claim 48, wherein said relating device comprises means for relating an activation/inactivation change-over of said red-eye-effect prevention means and a change-over of said detection means.

53. A camera according to claim 48, wherein said relating device comprises means for relating a red-eye-effect preventing illumination operation of said red-eye-effect prevention means and a change-over of said detection means.

54. A camera according to claim 48, wherein said relating device comprises means for relating a red-eye-effect preventing illumination time period of said red-eye-effect prevention means and a change-over of said detection means.

55. A camera according to claim 48, wherein said relating device comprises means for relating a number of red-eye-effect preventing illumination operations of said red-eye-effect prevention means and a change-over of said detection means.

56. A camera according to claim 48, further comprising:
   means for performing a flash photography irrespective of an operation of said relating device.

57. A camera according to claim 48, wherein said relating device comprising means for operating in accordance with a predetermined mode.

58. A camera according to claim 48, wherein said relating device comprises means for operating in accordance with a predetermined exposure mode.

59. A camera according to claim 48, wherein said relating device comprises means for operating in accordance with a rapid picture-taking exposure mode.

60. A camera according to claim 48, wherein said relating device comprises means for relating a change-over of said red-eye-effect prevention means and said detection means setting a detection area to a small area.

61. A camera according to claim 48, wherein said relating device comprises means for relating a change-over of said red-eye-effect prevention means and said detection means setting a detection area to a small area substantially at center of a view frame.

62. A camera according to claim 48, wherein said relating device comprises means for relating an operation of said red-eye-effect prevention means and an operation of an optical unit.

63. A camera according to claim 48, further comprising:
   photometry means for detecting photometry information, wherein said relating device comprises means for relating an operation of said red-eye-effect prevention means with an operation of said photometry means.

64. A camera according to claim 63, wherein said relating device comprises means for relating a change-over of said red-eye-effect prevention means and a change-over of said photometry means.

65. A camera according to claim 63, wherein said relating device comprises means for relating a change-over of said red-eye-effect prevention means and a photometry area change-over of said photometry means.

66. A camera according to claim 63, wherein said relating device comprises means for relating a change-over of said red-eye-effect prevention means and a change-over of said photometry means between a large photometry area and a small photometry area.

67. A camera according to claim 63, wherein said relating device comprises means for relating an activation/inactivation change-over of said red-eye-effect prevention means and a change-over of said photometry means.

68. A camera according to claim 63, wherein said relating device comprises means for relating a red-eye-effect preventing illumination operation of said red-eye-effect prevention means and a change-over of said photometry means.

69. A camera according to claim 63, wherein said relating device comprises means for relating a red-eye-effect preventing illumination time period of said red-eye-effect prevention means and a change-over of said photometry means.

70. A camera according to claim 63, wherein said relating device comprises means for relating a number of red-eye-effect preventing illumination operations of said red-eye-effect prevention means and a change-over of said photometry means.

71. A camera according to claim 63, further comprising means for performing a flash photography irrespective of an operation of said relating device.

72. A camera according to claim 63, wherein said relating device comprises means for operating in accordance with a predetermined mode.

73. A camera according to claim 63, wherein said relating device comprises means for operating in accordance with a predetermined exposure mode.

74. A camera according to claim 63, wherein said relating device comprises means for operating in accordance with a rapid picture-taking exposure mode.

75. A camera according to claim 63, wherein said relating device comprises means for relating a change-over of said red-eye-effect prevention means and said photometry means changing a photometry area to a small area.

76. A camera according to claim 63, wherein said relating device comprises means for relating a change-over of said red-eye-effect prevention means and said photometry means changing a photometry area to a small area substantially at center of a view frame.

77. A camera according to claim 63, wherein said relating device comprises means for relating an operation of said red-eye-effect prevention means and a timing of said photometry means.

78. A camera using red-eye-effect prevention means for preventing a red-eye-effect and photometry means for detecting photometry information, said camera comprising:
   a relating device for relating an operation of said red-eye-effect prevention means with an operation of said photometry means.

79. A camera according to claim 78, wherein said relating device comprises means for relating a change-over of said red-eye-effect prevention means and a change-over of said photometry means.

80. A camera according to claim 78, wherein said relating device comprises means for relating a change-over of said red-eye-effect prevention means and a photometry area change-over of said photometry means.

81. A camera according to claim 78, wherein said relating device comprises means for relating a change-over of said red-eye-effect prevention means and a change-over of said photometry means between a large photometry area and a small photometry area.

82. A camera according to claim 78, wherein said relating device comprises means for relating an activation/inactivation change-over of said red-eye-effect prevention means and a change-over of said photometry means.

83. A camera according to claim 78, wherein said relating device comprises means for relating a red-eye-effect preventing illumination operation of said red-eye-effect prevention means and a change-over of said photometry means.

84. A camera according to claim 78, wherein said relating device comprises means for relating a red-eye-effect preventing illumination time period of said red-eye-effect prevention means and a change-over of said photometry means.

85. A camera according to claim 78, wherein said relating device comprises means for relating a number of times of a red-eye-effect preventing illumination operation of said red-eye-effect prevention means and a change-over of said photometry means.

86. A camera according to claim 78, further comprising means for performing a flash photography irrespective of an operation of said relating device.

87. A camera according to claim 78, wherein said relating device comprises means for operating in accordance with a predetermined mode.

88. A camera according to claim 78, wherein said relating device comprises means for operating in accordance with a predetermined exposure mode.

89. A camera according to claim 78, wherein said relating device comprises means for operating in accordance with a rapid picture-taking exposure mode.

90. A camera according to claim 78, wherein said relating device comprises means for relating a red-eye-effect prevention means and said photometry means setting a photometry area to a small area.

91. A camera according to claim 78, wherein said relating device comprises means for relating a red-eye-effect prevention means and said photometry means setting a photometry area to a small area substantially at center of a view frame.

92. A camera according to claim 78, wherein said relating device comprises means for relating a red-eye-effect prevention means and a timing of said photometry means.

93. A camera according to claim 78, further comprising:

detection means for detecting at least one of distance information on an object and defocus information on the object, wherein said relating device comprises means for relating an operation of said red-eye-effect prevention means with an operation of said detection means.

94. A camera using red-eye-effect prevention means for preventing a red-eye-effect, detection means for detecting at least one of distance information on an object and defocus information on the object, and photometry means for detecting photometry information, said camera comprising:

a relating device for relating an operation of said red-eye-effect prevention with an operation of said detection means and an operation of said photometry means.

95. A camera using red-eye-effect prevention means for preventing a red-eye-effect, said camera comprising:

detection means for detecting at least one of distance information on an object and defocus information on the object; and relating means for relating an operation of said red-eye-effect prevention means with an operation of said detection means.

96. A camera according to claim 95, further comprising:

photometry means for detecting photometry information, wherein said relating means comprises means for relating an operation of said red-eye-effect prevention means with an operation of said photometry means.

97. A camera using red-eye-effect prevention means for preventing a red-eye-effect, said camera comprising:

photometry means for detecting photometry information; and relating means for relating an operation of said red-eye-effect prevention means with an operation of said photometry means.

98. A camera using red-eye-effect prevention means for preventing a red-eye-effect, said camera comprising:

detection means for detecting at least one of distance information on an object and defocus information on the object;

photometry means for detecting photometry information; and relating means for relating an operation of said red-eye-effect prevention means with an operation of said detection means and an operation of said photometry means.

99. A camera comprising:

red-eye-effect prevention means for preventing a red-eye-effect;

detection means for detecting at least one of distance information on an object and defocus information on the object; and relating means for relating an operation of said red-eye-effect prevention means with an operation of said detection means.

100. A camera according to claim 99, further comprising:

photometry means for detecting photometry information, wherein said relating means comprises means for relating an operation of said red-eye-effect prevention means with an operation of said photometry means.

101. A camera comprising:

red-eye-effect prevention means for preventing a red-eye-effect;

photometry means for detecting photometry information; and relating means for relating an operation of said red-eye-effect prevention means with an operation of said photometry means.

102. A camera using detection means for detecting at least one of distance information on an object and defocus information on the object, said camera comprising:

red-eye-effect prevention means for preventing a red-eye-effect; and relating means for relating an operation of said red-eye-effect prevention means with an operation of said detection means.

103. A camera according to claim 102, further comprising:

photometry means for detecting photometry information, wherein said relating means comprises means for relating an operation of said red-eye-effect prevention means with an operation of said photometry means.

104. A camera using photometry means for detecting photometry information, said camera comprising:

red-eye-effect prevention means for preventing a red-eye-effect; and relating means for relating an operation of said red-eye-effect prevention means with an operation of said photometry means.

105. A camera using detection means for detecting at least one of distance information on an object and defocus information on the object and photometry means for detecting photometry information, said camera comprising:

red-eye-effect prevention means for preventing a red-eye-effect; and relating means of relating an operation of said red-eye-effect prevention means with an operation of said detection means and an operation of said photometry means.

106. A camera according to any one of claims 27, 13, 47, 1, 48, 78, 94, 95, 97, 98, 99, 101, 102, 104 and 105, wherein said red-eye-effect prevention means comprises means for emitting a red-eye-effect prevention light.

107. A camera according to any one of claims 27, 13, 47, 1, 48, 78, 94, 95, 97, 98, 99, 101, 102, 104 and 105, wherein said red-eye-effect prevention means comprises means for emitting a red-eye-effect prevention light a predetermined number of times.

108. A camera according to any one of claims 27, 13, 47, 1, 48, 78, 94, 95, 97, 98, 99, 101, 102, 104 and 105, wherein said red-eye-effect prevention means comprises means for emitting a red-eye-effect prevention light at a predetermined time period.

109. Apparatus for a camera having a selectable rapid picture-taking exposure mode and using a red-eye-effect prevention means for preventing a red-eye-effect, said apparatus comprising:

a changing device for changing an operation of said red-eye-effect prevention means in accordance with the rapid picture-taking exposure mode.

110. Apparatus according to claim 109, wherein said changing device comprises means for limiting the operation of said red-eye-effect prevention means in accordance with the rapid picture-taking exposure mode.

111. Apparatus according to claim 110, wherein said limiting means includes means for reducing a time for illumination of said red-eye-effect prevention means.

112. Apparatus according to claim 110, wherein said limiting means includes means for inhibiting the operation of said red-eye-effect prevention means.

113. Apparatus according to claim 110, wherein said limiting means includes means for reducing a number of times of illumination of said red-eye-effect prevention means.

114. Apparatus for a camera having a selectable rapid picture-taking exposure mode, said apparatus comprising:
   detection means for detecting at least one of distance information on an object and defocus information on the object;
   changing means for setting an operation of said detection means in accordance with the rapid picture-taking exposure mode.

115. Apparatus according to claim 114, wherein said changing means includes means for setting a detection area of said detection means in accordance with the rapid picture-taking exposure mode.

116. Apparatus according to claim 115, wherein said changing means includes means for setting the detection area of said detection means to a small area substantially at a center of a view frame in accordance with the rapid picture-taking exposure mode.

117. Apparatus according to claim 115, wherein said changing means includes means for setting the detection area of said detection means between a large and a small area in accordance with the rapid picture-taking exposure mode.

118. Apparatus according to claim 117, wherein said changing means comprises means for setting the detection area of said detection means to the small area in accordance with the rapid picture-taking exposure mode.

119. Apparatus according to claim 117, wherein said changing means includes means for selecting a position of the small detection area.

120. Apparatus according to claim 117, wherein said changing means includes mean for designating one of a plurality of detection areas as said small area.

121. Apparatus according to claim 114, further comprising photographing optical unit operating means for causing a photographing optical unit to operate sequentially after a detection operation of said detection and in accordance with the rapid picture-taking exposure mode.

122. Apparatus according to claim 114, further comprising photographing optical unit operating means for causing a photographing optical unit to operate in response to a stroke operation of a shutter release button and in accordance with the rapid picture-taking exposure mode, said stroke operation also actuating said detection means.

123. Apparatus according to claim 114, further comprising:
   red-eye-effect prevention means for preventing a red-eye effect; and
   limitation means for limiting an operation of said red-eye-effect prevention means in accordance with the rapid picture-taking exposure mode.

124. Apparatus according to claim 123, wherein said limitation means includes means for reducing a time for illumination of said red-eye-effect prevention means.

125. Apparatus according to claim 123, wherein said limitation means includes means for inhibiting the operation of said red-eye-effect prevention means.

126. Apparatus according to claim 123, wherein said limitation means includes means for reducing a number of times of illumination of said red-eye-effect prevention means.

127. Apparatus according to claim 114 further comprising:
   photometry means for detecting photometry information; and
   second changing means for setting an operation of said photometry means in accordance with the rapid picture-taking exposure mode.

128. Apparatus according to claim 127, wherein said second changing means includes means for setting a photometry area of said photometry means in accordance with the rapid picture-taking exposure mode.

129. Apparatus according to claim 127, further comprising:
   red-eye-effect prevention means for preventing a red-eye-effect; and
   third changing means for changing an operation of said red-eye-effect prevention means in accordance with the rapid picture-taking exposure mode.

130. Apparatus according to claim 127, further comprising exposure means for performing an exposure operation sequentially after a photometry operation of said photometry means and in accordance with the rapid picture-taking exposure mode.

131. Apparatus according to claim 127, wherein said photometry means includes means for performing a photometry operation in accordance with the rapid picture-taking exposure mode and in response to a stroke operation of a shutter release button, said stroke operation also actuating an exposure operation.

132. Apparatus according to claim 114 further comprising:
   red-eye-effect prevention means for preventing a red-eye-effect;
   second changing means for changing an operation of said red-eye-effect prevention means in accordance with the rapid picture-taking exposure mode.

133. Apparatus for a camera having a selectable rapid picture-taking exposure mode, said apparatus comprising:
   photometry means for detecting photometry information; and
   changing means for setting an operation of said photometry means in accordance with the rapid picture-taking exposure mode.

134. Apparatus according to claim 133, further comprising exposure means for performing an exposure operation subsequent to a photometry operation of said photometry means in accordance with the rapid picture-taking exposure mode.

135. Apparatus according to claim 133, wherein said photometry means includes means for performing a photometry operation in accordance with the rapid picture-taking exposure mode and in response to a stroke operation of a shutter release button, said stroke operation also actuating an exposure operation.

136. Apparatus according to claim 133, further comprising second changing means including means for setting a photometry area of said photometry means in accordance with the rapid picture-taking exposure mode.

137. Apparatus according to claim 136, wherein said changing means includes means for changing the photometry area of said photometry means between a large area and a small area.

138. Apparatus according to claim 137, further comprising:
 red-eye-effect prevention means for preventing a red-eye-effect; and
 limitation means for limiting an operation of said red-eye-effect prevention means in accordance with the rapid picture-taking exposure mode.

139. Apparatus according to claim 138, wherein said limitation means includes means for reducing a time for illumination of said red-eye-effect prevention means.

140. Apparatus according to claim 138, wherein said limitation means includes means for inhibiting the operation of said red-eye-effect prevention means.

141. Apparatus according to claim 138, wherein said limitation means includes means for reducing a number of times of illumination of said red-eye-effect prevention means.

142. Apparatus according to claim 137, wherein said second changing means comprises means for setting the photometry area of photometry means to the small photometry area in accordance with the rapid picture-taking exposure mode.

143. Apparatus according to claim 136, wherein said changing means includes means for setting the photometry area of said photometry means to a small photometry area substantially at a center of a view frame in accordance with the rapid picture-taking exposure mode.

144. Apparatus according to claim 137, further comprising exposure means for performing an exposure operation subsequent to a photometry operation of said photometry means in accordance with the rapid picture-taking exposure mode.

145. 186. Apparatus according to claim 137, wherein said changing means includes means for designating one of a plurality of photometry field areas as said small photometry field area.

146. Apparatus according to claim 137, further comprising:
 red-eye-effect prevention means for preventing a red-eye effect; and
 second changing means for setting an operation of said red-eye-effect prevention means in accordance with the rapid picture-taking exposure mode.

147. Apparatus for a camera using red-eye-effect prevention means for preventing a red-eye-effect and detection means for detecting at least one of distance information on an object and defocus information on the object, said apparatus comprising:
 a relating device for relating an operation of said red-eye-effect prevention means with an operation of said detection means.

148. Apparatus according to claim 147, wherein in said relating device comprises means for relating a change-over of said red-eye-effect prevention means and a change-over of said detection means.

149. Apparatus according to claim 147, wherein said relating device comprises means for relating a change-over of said red-eye-effect prevention means and a detection area change-over of said detection means.

150. Apparatus according to claim 147, wherein said relating device comprises means for relating a change-over of said red-eye-effect prevention means and a change-over of said detection means between a large detection area and a small detection area.

151. Apparatus according to claim 147, wherein said relating device comprises means for relating an activation/inactivation change-over of said red-eye-effect prevention means and a change-over of said detection means.

152. Apparatus according to claim 147, wherein said relating device comprises means for relating a red-eye-effect preventing illumination operation of said red-eye-effect prevention means and a change-over of said detection means.

153. Apparatus according to claim 147, wherein said relating device comprises means for relating a red-eye-effect preventing illumination time period of said red-eye-effect prevention means and a change-over of said detection means.

154. Apparatus according to claim 147, wherein said relating device comprises means for relating a number of red-eye-effect preventing illumination operations of said red-eye-effect prevention means and a change-over of said detection means.

155. Apparatus according to claim 147, further comprising exposure means for performing a flash photography irrespective of an operation of said relating device.

156. Apparatus according to claim 147, wherein said relating device comprises means for operating in accordance with a predetermined mode.

157. Apparatus according to claim 147, wherein said relating device comprises means for operating in accordance with a predetermined exposure mode.

158. Apparatus according to claim 147, wherein said relating device comprises means for operating in accordance with a rapid picture-taking exposure mode.

159. Apparatus according to claim 147, wherein said relating device comprises means for relating a change-over of said red-eye-effect prevention means and said detection means setting a detection area to a small area.

160. Apparatus according to claim 147, wherein said relating device comprises means for relating a change-over of said red-eye-effect prevention means and said detection means setting a detection area to a small area substantially at a center of a view frame.

161. Apparatus according to claim 147, wherein said relating device comprises means for relating an operation of said red-eye-effect prevention means and an operation of an optical unit.

162. Apparatus according to claim 147, further comprising:
 photometry means for detecting photometry information,
 wherein said relating device comprises means for relating an operation of said red-eye-effect prevention means with an operation of said photometry means.

163. Apparatus according to claim 162, wherein said relating device comprises means for relating a change-over of said red-eye-effect prevention means and a change-over of said photometry means.

164. Apparatus according to claim 163, wherein said relating device comprises means for relating a change-over of said red-eye-effect prevention means and a photometry area change-over of said photometry means.

165. Apparatus according to claim 162, wherein said relating device comprises means for relating a change-over of said red-eye-effect prevention means and a change-over of said detection means between a large photometry area and a small photometry area.

166. Apparatus according to claim 162, wherein said relating device comprises means for relating an activation/inactivation change-over of said red-eye-effect prevention means and a change-over of said photometry means.

167. Apparatus according to claim 162, wherein said relating device comprises means for relating a red-eye-effect preventing illumination operation of said red-eye-effect prevention means and a change-over of said photometry means.

168. Apparatus according to claim 162, wherein said relating device comprises means for relating a red-eye-effect preventing illumination time period of said red-eye-effect prevention means and a change-over of said photometry means.

169. Apparatus according to claim 162, wherein said relating device comprises means for relating a number of red-eye-effect preventing illumination operations of said red-eye-effect prevention means and a change-over of said photometry means.

170. Apparatus according to claim 162, further comprising exposure means for performing a flash photography irrespective of an operation of said relating device.

171. Apparatus according to claim 162, wherein said relating device comprises means for operating in accordance with a predetermined mode.

172. Apparatus according to claim 162, wherein said relating device comprises means for operating in accordance with a predetermined exposure mode.

173. Apparatus according to claim 162, wherein said relating device comprises means for operating in accordance with a rapid picture-taking exposure mode.

174. Apparatus according to claim 162, wherein said relating device comprises means for relating a change-over of said red-eye-effect prevention means and said photometry means setting a photometry area to a small area.

175. Apparatus according to claim 162, wherein said relating device comprises means for relating a change-over of said red-eye-effect prevention means and said photometry means setting a photometry area to a small area substantially at a center of a view frame.

176. Apparatus according to claim 162, wherein said relating device comprises means for relating an operation of said red-eye-effect prevention means and a timing of said photometry means.

177. Apparatus for a camera using red-eye-effect prevention means for preventing a red-eye-effect, and photometry means for detecting photometry information, said apparatus comprising:
a relating device for relating an operation of said red-eye-effect prevention means with an operation of said photometry means.

178. Apparatus according to claim 177, wherein said relating device comprises means for relating a change-over of said red-eye-effect prevention means and a change-over of said photometry means.

179. Apparatus according to claim 177, wherein said relating device comprises means for relating a change-over of said red-eye-effect prevention means and a photometry area change-over of said photometry means.

180. Apparatus according to claim 177, wherein said relating device comprises means for relating a change-over of said red-eye-effect prevention means and a change-over of said photometry means between a large photometry area and a small photometry area.

181. Apparatus according to claim 177, wherein said relating device comprises means for relating an activation/inactivation change-over of said red-eye-effect prevention means and a change-over of said photometry means.

182. Apparatus according to claim 177, wherein said relating device comprises means for relating a red-eye-effect preventing illumination operation of said red-eye-effect prevention means and a change-over of said photometry means.

183. Apparatus according to claim 177, wherein said relating device comprises means for relating a red-eye-effect preventing illumination time period of said red-eye-effect prevention means and a change-over of said photometry means.

184. Apparatus according to claim 177, wherein said relating device comprises means for relating a number of red-eye-effect preventing illumination operations of said red-eye-effect prevention means and a change-over of said photometry means.

185. Apparatus according to claim 177, further comprising exposure means for performing a flash photography irrespective of an operation of said relating device.

186. Apparatus according to claim 177, wherein said relating device comprises means for operating in accordance with a predetermined mode.

187. Apparatus according to claim 177, wherein said relating device comprises means for operating in accordance with a predetermined exposure mode.

188. Apparatus according to claim 177, wherein said relating device comprises means for operating in accordance with a rapid picture-taking exposure mode.

189. Apparatus according to claim 177, wherein said relating device comprises means for relating a change-over of said red-eye-effect prevention means and said photometry means setting a photometry area to a small area.

190. Apparatus according to claim 177, wherein said relating device comprises means for relating a change-over of said red-eye-effect prevention means and said photometry means setting a detection area to a small area substantially at a center of a view frame.

191. Apparatus according to claim 177, wherein said relating device comprises means for relating an operation of said red-eye-effect prevention means and a timing of said photometry means.

192. Apparatus according to claim 177, further comprising:
detection means for detecting at least one of distance information on an object and defocus information on the object,
wherein said relating device comprises means for relating an operation of said red-eye-effect prevention means with an operation of said detection means.

193. Apparatus for a camera using a red-eye-effect prevention means for preventing a red-eye-effect, detection means for detecting at least one of distance information on an object and defocus information on the object, and photometry means for detecting photometry information, said apparatus comprising:
a relating device for relating an operation of said red-eye-effect prevention means with an operation of said detection means and an operation of said photometry means.

194. Apparatus for a camera using a red-eye-effect prevention means for preventing a red-eye-effect, said apparatus comprising:

detection means for detecting at least one of distance information on an object and defocus information on the object; and relating means for relating an operation of said red-eye-effect prevention means with an operation of said detection means.

195. Apparatus according to claim 194, further comprising:

photometry means for detecting photometry information, wherein said relating means comprises means for relating an operation of said red-eye-effect prevention means with an operation of said photometry means.

196. Apparatus for a camera using red-eye-effect prevention means for preventing a red-eye-effect, said apparatus comprising:

photometry means for detecting photometry information; and relating means for relating an operation of said red-eye-effect prevention means with an operation of said photometry means.

197. Apparatus for a camera using red-eye-effect prevention means for a preventing a red-eye-effect, said apparatus comprising:

detection means for detecting at least one of distance information on an object and defocus information on the object;

photometry means for detecting photometry information; and relating means for relating an operation of said red-eye-effect prevention means with an operation of said detection means and an operation of said photometry means.

198. Apparatus for a camera, comprising:

red-eye-effect prevention means for preventing a red-eye effect;

detection means for detecting at least one of distance information on an object and defocus information on the object; and relating means for relating an operation of said red-eye-effect prevention means with an operation of said detection means.

199. Apparatus according to claim 198, further comprising:

photometry means for detecting photometry information, wherein said relating means comprises means for relating an operation of said red-eye-effect prevention means with an operation of said photometry means.

200. Apparatus for a camera, comprising:

red-eye-effect prevention means for preventing a red-eye-effect;

photometry means for detecting photometry information; and relating means for relating an operation of said red-eye-effect prevention means with an operation of said photometry means.

201. Apparatus for a camera using detection means for detecting at least one of distance information on an object and defocus information on the object, said apparatus comprising:

red-eye-effect prevention means for preventing a red-eye-effect; and relating means for relating an operation of said red-eye-effect prevention means with an operation of said detection means.

202. Apparatus according to claim 201, further comprising:

photometry means for detecting photometry information, wherein said relating means comprises means for relating an operation of said red-eye-effect prevention means with an operation of said photometry means.

203. Apparatus for a camera using a red-eye-effect prevention means for detecting photometry information, said apparatus comprising:

red-eye-effect prevention means for preventing a red-eye-effect; and relating means for relating an operation of said red-eye-effect prevention means with an operation of said photometry means.

204. Apparatus for a camera using detection means for detecting at least one of distance information on an object and defocus information on the object, and photometry means for detecting photometry information, said apparatus comprising:

red-eye-effect prevention means for preventing a red-eye-effect; and relating means for relating an operation of said red-eye-effect prevention means with an operation of said detection means and an operation of said photometry means.

205. Apparatus according to any one of claims 109, 129, 132, 146. 147 177, 193, 194, 196, 197, 198, 200, 201, 203 and 204, wherein said red-eye-effect prevention means comprises means for emitting a red-eye-effect prevention light.

206. Apparatus according to any one of claims 109, 129, 132, 146. 147 177, 193, 194, 196, 197, 198, 200, 201, 203 and 204, wherein said red-eye-effect prevention means comprises means for emitting a red-eye-effect prevention light a predetermined number of times.

207. Apparatus according to any one of claims 109, 129, 132, 146. 147 177, 193, 194, 196, 197, 198, 200, 201, 203 and 204, wherein said red-eye-effect prevention means comprises means for emitting a red-eye-effect prevention light at a predetermined time.

* * * * *

UNITED STATES PATENT AND TRADEMARK OFFICE
CERTIFICATE OF CORRECTION

PATENT NO. : 5,404,192  
DATED : April 4, 1995  
INVENTOR(S) : Konishi et al.

It is certified that error appears in the above-indentified patent and that said Letters Patent is hereby corrected as shown below: On the title page: Item

[56] FOREIGN PATENT DOCUMENTS:

```
 "1235932   9/1989   Japan
  1244435   9/1989   Japan
  1244436   9/1989   Japan
   318523   2/1991   Japan
  3144427   6/1991   Japan
  3144428   6/1991   Japan" should read
--1-235932   9/1989   Japan
  1-244435   9/1989   Japan
  1-244436   9/1989   Japan
  3-18523    2/1991   Japan
  3-144427   6/1991   Japan
  3-144428   6/1991   Japan--.
```

[57] ABSTRACT:

Line 5, "having" should read --has--.

COLUMN 10:

Line 37, "10" should be deleted; and  
Line 43, "15" should be deleted.

COLUMN 11:

Line 12, "20" should be deleted; and  
Line 18, "25" should be deleted.

UNITED STATES PATENT AND TRADEMARK OFFICE
CERTIFICATE OF CORRECTION

PATENT NO. : 5,404,192  
DATED : April 4, 1995  
INVENTOR(S) : Konishi et al.

Page 2 of 3

It is certified that error appears in the above-indentified patent and that said Letters Patent is hereby corrected as shown below:

COLUMN 12:

Line 37, "Drawings" should read --drawings--.

COLUMN 13:

Line 52, "claim 14" should read --claim 14,--.

COLUMN 14:

Line 55, "claim 28" should read --claim 28,--;
Line 60, "including" should read --includes--;
Line 61, "the," should read --the--; and
Line 64, "claim 30" should read --claim 30,--.

COLUMN 15:

Line 65, "claim 39" should read --claim 39,--.

COLUMN 22:

Line 37, "claim 114" should read --claim 114,--.

COLUMN 23:

Line 39, "145.186." should read --145.--; and
Line 58, "in" should be deleted.

UNITED STATES PATENT AND TRADEMARK OFFICE
CERTIFICATE OF CORRECTION

PATENT NO. : 5,404,192
DATED : April 4, 1995
INVENTOR(S) : Konishi et al.

It is certified that error appears in the above-indentified patent and that said Letters Patent is hereby corrected as shown below:

COLUMN 27:

Line 25, "a" (first occurrence) should be deleted.

COLUMN 28:

Line 43, "146.147" should read --146, 147--;
Line 48, "146.147" should read --146, 147--; and
Line 53, "146.147" should read --146, 147--

Signed and Sealed this

Eighteenth Day of July, 1995

Attest:

BRUCE LEHMAN

Attesting Officer    Commissioner of Patents and Trademarks